United States Patent [19]

Petrick et al.

[11] 4,200,815
[45] Apr. 29, 1980

[54] MHD GENERATING SYSTEM

[75] Inventors: Michael Petrick, Joliet; Edward S. Pierson, Chicago; Felix Schreiner, Mokena, all of Ill.

[73] Assignee: The United States of America as represented by the United States Department of Energy, Washington, D.C.

[21] Appl. No.: 943,827

[22] Filed: Sep. 19, 1978

[51] Int. Cl.² ............................................. H02N 4/02
[52] U.S. Cl. .................................................... 310/11
[58] Field of Search ........................................ 310/11

[56] References Cited

U.S. PATENT DOCUMENTS

| | | | |
|---|---|---|---|
| 3,401,277 | 9/1968 | Larson | 310/11 |
| 3,414,744 | 12/1968 | Petrick | 310/11 |
| 3,443,129 | 5/1969 | Hammitt | 310/11 |
| 3,465,180 | 9/1969 | Von Ohain et al. | 310/11 |
| 3,467,842 | 9/1969 | Carrasse | 310/11 |
| 4,163,910 | 8/1979 | Matthews et al. | 310/11 |

*Primary Examiner*—Donovan F. Duggan
*Attorney, Agent, or Firm*—R. V. Lupo; Frank H. Jackson

[57] ABSTRACT

According to the present invention, coal combustion gas is the primary working fluid and copper or a copper alloy is the electrodynamic fluid in the MHD generator, thereby eliminating the heat exchangers between the combustor and the liquid-metal MHD working fluids, allowing the use of a conventional coalfired steam bottoming plant, and making the plant simpler, more efficient and cheaper. In operation, the gas and liquid are combined in a mixer and the resulting two-phase mixture enters the MHD generator. The MHD generator acts as a turbine and electric generator in one unit wherein the gas expands, drives the liquid across the magnetic field and thus generates electrical power. The gas and liquid are separated, and the available energy in the gas is recovered before the gas is exhausted to the atmosphere. Where the combustion gas contains sulfur, oxygen is bubbled through a side loop to remove sulfur therefrom as a concentrated stream of sulfur dioxide. The combustor is operated substoichiometrically to control the oxide level in the copper.

5 Claims, 3 Drawing Figures

MHD GENERATING SYSTEM

CONTRACTUAL ORIGIN OF THE INVENTION

The invention described herein was made in the course of, or under, a contract with the U.S. DEPARTMENT OF ENERGY.

BACKGROUND OF THE INVENTION

This invention relates to a magnetohydrodynamic (MHD) generating system. In more detail the invention relates to an open-cycle coal-fired two-phase liquid metal MHD generating system. The invention also relates to a method of operating an open-cycle coal-fired MHD generating system.

Within the past few years, the development of MHD power generating systems has been accelerating with the effort focused on coal-fired open-cycle plasma MHD systems. Such systems employ an ionized coal combustion gas seeded with $K_2CO_3$ as both the thermodynamic and electrodynamic fluid in the MHD generator at temperatures up to 2800 K. and use heat exchangers (radiant boiler) to transfer thermal energy from the MHD working fluid to a steam bottoming plant.

Less effort has been applied to closed-cycle liquid-metal and plasma MHD systems since these systems are at a lower state of development than is the coal-fired open-cycle plasma MHD system and appear to be more expensive and less efficient than open-cycle plasma MHD. A closed-cycle liquid-metal MHD system employs, for example, an inert gas (helium) as the primary (i.e. thermodynamic) working fluid and a liquid metal (sodium or lithium) as the electrodynamic fluid in the MHD generator at temperatures up to about 1260 K.; and a closed-cycle plasma MHD system employs, for instance, argon seeded with cesium in the MHD generator at a top temperature of around 2000 K. Both also require heat exchangers to transfer the thermal energy from the coal combustor to the MHD working fluid(s) in addition to heat exchanger(s) to transfer thermal energy from the MHD working fluid to the steam bottoming plant.

The open-cycle coal-fired plasma MHD system involves relatively-complex high-risk technology, primarily because of the required high temperatures, and several different elements of the system will require substantial development efforts before commercial development is possible.

SUMMARY OF THE INVENTION

According to the present invention, coal combustion gas is the primary working fluid and copper or a copper alloy is the electrodynamic fluid in the MHD generator, thereby eliminating the heat exchangers between the combustor and the liquid-metal MHD working fluids, allowing the use of a conventional coal-fired steam bottoming plant, and making the plant simpler, more efficient and cheaper. In operation, the gas and liquid are combined in a mixer and the resulting two-phase mixture enters the MHD generator. The MHD generator acts as a turbine and electric generator in one unit wherein the gas expands, drives the liquid across the magnetic field and thus generates electrical power. The gas and liquid are separated, and the available energy in the gas is recovered before the gas is exhausted to the atmosphere. Where the combustion gas contains sulfur, oxygen is bubbled through a side loop to remove sulfur therefrom as a concentrated stream of sulfur dioxide. The combustor is operated substoichiometrically to control the oxide level in the copper.

DETAILED DESCRIPTION OF THE INVENTION

Figure 1:
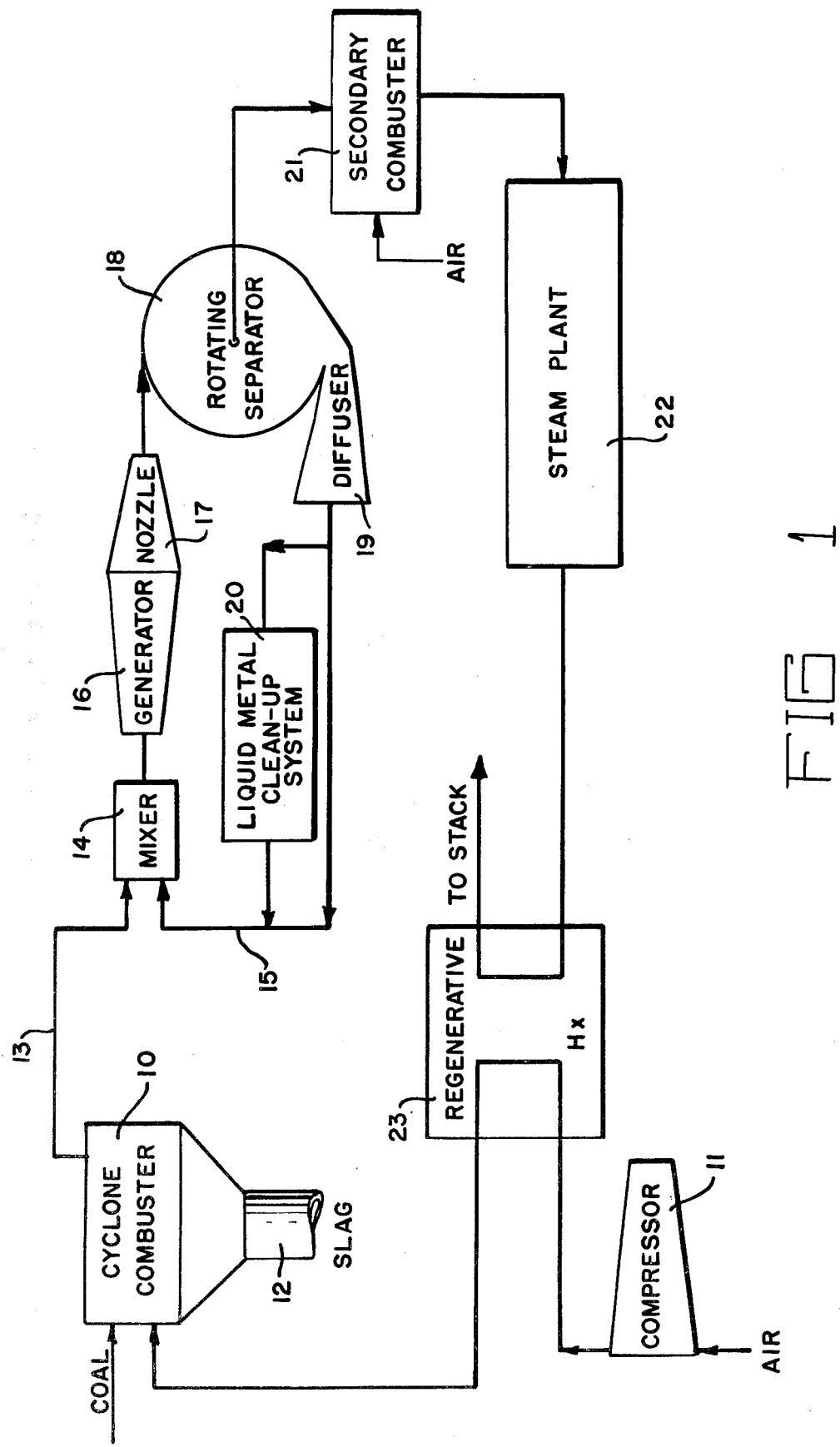
FIG. 1 is a schematic of an open-cycle, coal-fired, two-phase, liquid metal MHD generating system according to the present invention.

As shown in FIG. 1, coal is burned in cyclone combustor 10 employing air from compressor 11, slag being withdrawn through outlet 12 and combustion gases passing through line 13 to mixer 14. Compressor 11 may be a single or multistage compressor with or without interstage cooling. In mixer 14 combustion gases are mixed with liquid copper from recycle line 15 to produce a homogeneous two-phase fluid which is directed through MHD generator 16 to produce electrical power. The two-phase fluid exiting nozzle 17 is directed into rotating separator 18 wherein the gaseous and liquid components of the two-phase fluid are separated. The molten copper is withdrawn through diffuser 19 to convert velocity to pressure prior to returning the copper to mixer 14. A side stream of the copper from the diffuser is passed through clean-up system 20 where the sulfur is removed, for example, by bubbling oxygen (air) through the liquid to form a concentrated stream of $SO_2$. Other contaminants would also be removed in the clean-up system. Alternatively, nozzle 17 can be eliminated and the liquid can be circulated by a liquid metal pump (not shown). For example, a pump and rotating separator can be combined.

Following separation from the liquid, the gas stream is introduced into secondary combustor 21 where a small amount of oxygen is added to complete the combustion, and the residual heat of the gas stream is then utilized in a conventional steam plant 22 and in regenerative heat exchanger 23 prior to being exhausted to the atmosphere. Heat exchanger 23 is an optional feature.

Table I compares conditions required for an open-cycle liquid metal MHD system according to the present invention and an open-cycle plasma system.

TABLE I

| | Open-Cycle Liquid Metal | | Open-Cycle Plasma | | Closed-Cycle Liquid Metal | |
|---|---|---|---|---|---|---|
| Component | Required | Temp., K. | Required | Temp., K. | Required | Temp., K. |
| Combustor | Yes | 1750–2220 | Yes | 2750–3000 | Yes | <1400 |
| MHD Generator (Inlet) | Yes | 1100–1600 | Yes | 2800 | Yes | <1260 |
| Air Preheater (Exit) | No | | Yes | 1600–1900 | No | — |
| Regenerative Hx | Yes | 350–500 | Yes | 350–500 | Yes | 350–500 |

TABLE I-continued

| Component | Open-Cycle Liquid Metal Required | Temp., K. | Open-Cycle Plasma Required | Temp., K. | Closed-Cycle Liquid Metal Required | Temp., K. |
|---|---|---|---|---|---|---|
| Radiant Boiler | No | | Yes | 1750-2250 | No | — |
| Seed Injection/ Reprocessing/ Removal from Boiler | No | | Yes | — | No | — |
| Particulate Removal | No | | Yes | — | No | — |
| Liquid Metal Reprocessing | Yes | 1100-1600 | No | | No | — |
| Mixer and Separator | Yes | 1100-1600 | Yes | | Yes | <1260 |

It is to be noted that the temperatures are considerably lower for LMMHD than for plasma MHD—at least 530 K. lower at the combustor exit and 1200 K. lower in the MHD generator. Because of the lower temperature, LMMHD does not use an air preheater or a radiant boiler, eliminating two troublesome high-temperature components that are mandatory in the open-cycle plasma MHD concept. Separately fired air heaters or oxygen addition are not employed. The entire seed injection and reprocessing system with its inherent losses and contamination problems (i.e. seed condensation on and subsequent removal from the steam boiler) is eliminated because the liquid metal provides the electrical conductivity.

Figure 2:
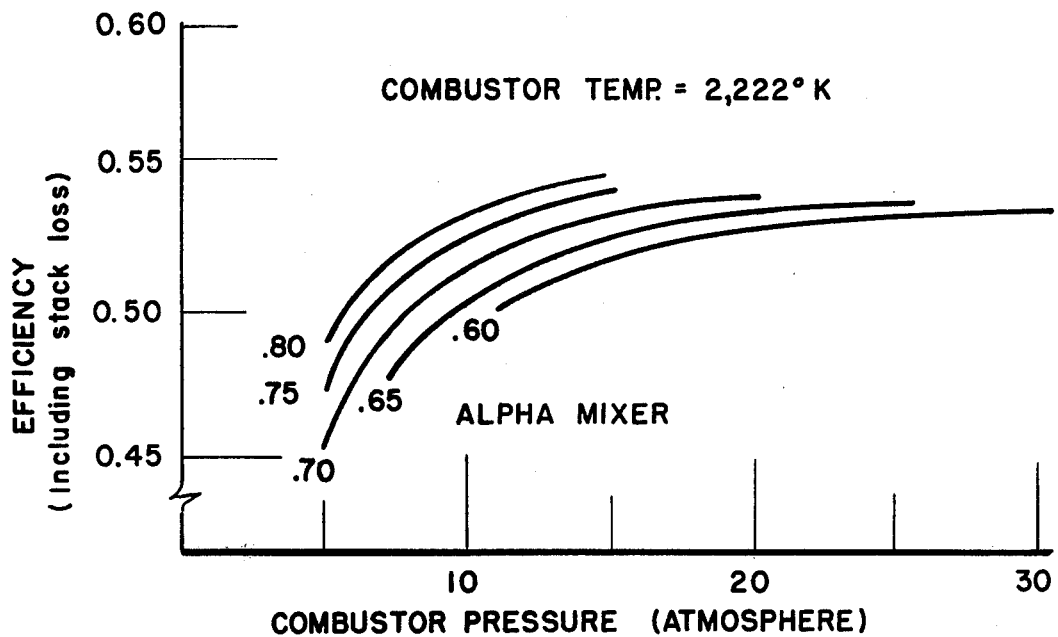
FIG. 2 shows the calculated efficiency (allowing for all component and flow loop losses and stack loss but not auxiliary power) of the system as a function of combustor pressure at a combustor exit temperature of 2222 K. for various mixer exit void fractions (Alpha Mixer)
Figure 3:
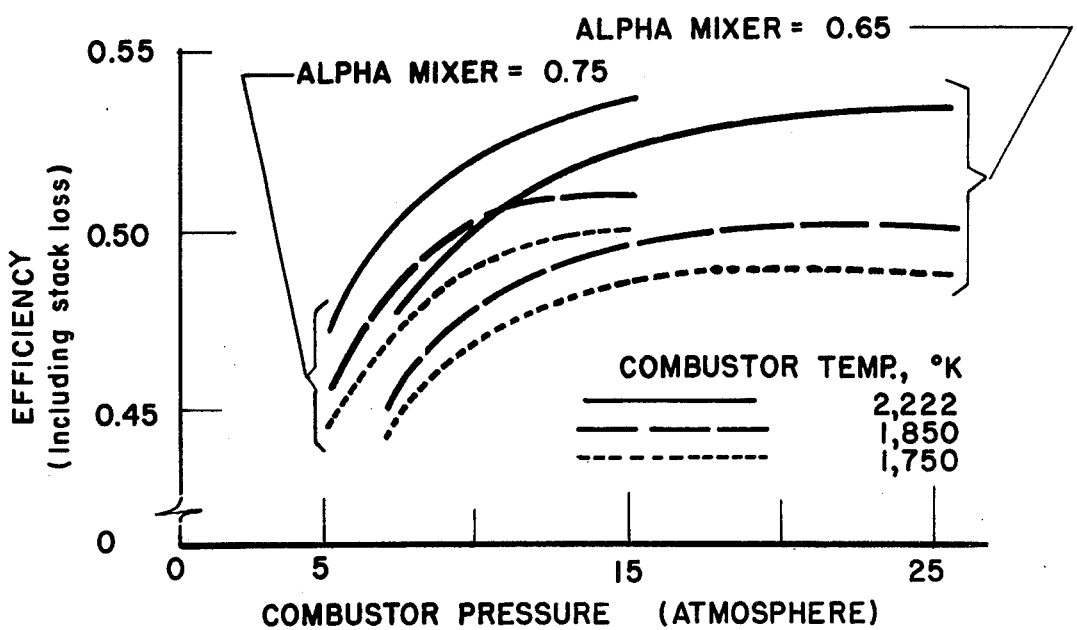
FIG. 3 shows the effect of decreasing the combustor temperature on efficiency.

A preliminary investigation of the open-cycle, liquid-metal MHD concept has shown very attractive performance; i.e. efficiencies comparable to those for open-cycle plasma MHD at significantly lower temperatures. The calculated efficiencies allowing for all component and flow loop losses and stack loss but not auxiliary power are shown in FIG. 2 for a combustion temperature of 2222 K. Efficiencies well in excess of 0.50 appear attainable at a combustor temperature of 1850 K. Note that the copper temperature is 300 to 700 K. lower than the combustor temperature, and it decreases for higher pressure ratios and mixer exit void fractions.

Silicon carbide is preferred as containment material as copper does not wet it and the existence of no erosion/corrosion problems has been demonstrated at lower velocities. Other materials that have in the past been used for the linings of furnaces and crucibles containing liquid copper at temperatures above 1365 K. such as magnesite, silicate refractories, silica itself or kyomite might also be used.

An investigation of coal combustion gas - liquid copper reactions has been initiated. Both coal combustion products and pure $SO_2$, $O_2$, $MO$, $CO$, and $CO_2$ have been bubbled through liquid copper. The results show that liquid copper reacts with the sulfur and oxygen in sulfur dioxide, the oxygen in nitrogen oxide and the sulfur in coal. There is also evidence that liquid copper will decompose $NO_x$. Thus copper functions both as the electrodynamic working fluid in the MHD device and also as part of the air pollution control system.

To remove the sulfur from the copper, air or oxygen is bubbled through a side stream of copper in clean-up system 20, yielding a concentrated stream of sulfur dioxide. The oxide level in the copper is controlled by operating the combustor substoichiometrically—experiments show that pure carbon monoxide or substoichiometric coal combustion products remove the oxygen from the copper, as known from copper processing industry experience. This is necessary since copper oxide will be formed if oxygen is present in the coal combustion gas. Substoichiometric operation, of course, necessitates the use of secondary combustor 21. In addition, trace impurities may concentrate in the copper. These would also be removed in the liquid-metal clean-up system.

Various copper alloys having a lower melting point than that of copper may also be used. For example, alloys of copper with silver, tin, zinc, lead and aluminum may be used. Tin or a tin alloy are also possible. Copper and copper alloys are indicated as the metal of choice in veiw of the following considerations. For a metal to be suitable as a fluid in the MHD generator it must have a sufficiently low melting point to maintain a liquid phase at the operating temperature of the MHD channel and a sufficiently low vapor pressure so that none of it is carried over with the combustion gases into the steam boiler. From the standpoint of achieving high thermal to electrical conversion efficiencies, it is advantageous to keep the liquid-metal operating temperature as high as practicable.

It is very important to choose a metal with low affinities to oxygen and other elements in the mixture of combustion gases with which it will be in intimate contact. Any reaction of the liquid metal with constituents of the combustion gas must be kept to a minimum and should only lead to products that permit easy recovery of the metal itself. Since there is only a finite amount of metal in the MHD loop which sees an effectively infinite amount of combustion gas any degree of reaction, however small, will lead to the eventual complete consumption of the metal unless it is counteracted continuously.

From the chemist's standpoint, a noble metal would represent the best choice since it would be totally inert to chemical interactions. However, of the noble metals only silver and gold have sufficiently low melting points, and the choice of either of these two appears impractical for economic reasons. Only silver might have a chance in this respect. As stated before, a condition of absolute chemical inertness is not necessary for a metal to be useful for MHD power conversion. It is sufficient if the metal can be recovered with ease from the products of interaction with the combustion gases or with oxygen.

The gases from the combustor will be a mixture of variable composition depending on the type of fuel (coal) and on the relative amount of air admitted, i.e., stoichiometric or substoichiometric combustion. The mixture will be made up of nitrogen, carbon monoxide, carbon dioxide, water, hydrogen, hydrocarbons, sulfur dioxide, possibly sulfur and hydrogen sulfide, and particulate matter (fly ash). The fly ash may prove very abrasive at high flow velocities and may have to be removed before the gas enters the MHD channel. If it is not removed, the particulate matter will appear as a scum on the liquid copper and has to be skimmed. It is also probable that iron dissolves in the copper and must be removed later.

In general, the combustion gases are a reducing atmosphere, especially after substoichiometric combustion, and the major reaction is expected to be the formation of a sulfide. This sulfide can be removed in the same way as in the smelting process. There the mixture of copper and copper sulfide is converted by forcing oxygen or air into the melt. Part of the copper is thereby converted to the oxide, $Cu_2O$, which reacts with the sulfide according to the equation $$2Cu_2O + Cu_2S = 6Cu + SO_2$$

This reaction is quantitative and exothermic. Excess oxygen leads to a copper melt containing dissolved $Cu_2O$ which will react with any of the reducing gases from the combustor, e.g. CO, $H_2$, and hydrocarbons. It is therefore easy to keep the molten copper free of sulfide and of oxide by either adding oxygen or air, or by exposing it to a reducing gas mixture obtained by substoichiometric combustion. Both the sulfide and the oxide will be soluble to a certain extent in the molten metal and it may be possible to monitor the gradual buildup of these impurities by measuring the conductivity of the melt.

Even though copper has a high affinity for sulfur it is possible that all sulfur cannot be removed from the combustion gases, and stack gas scrubbing may still be necessary.

The embodiments of the invention in which an exclusive property or privilege is claimed are defined as follows:

1. An open-cycle coal-fired MHD generating system comprising an MHD generator, means for combusting coal, a mixer for mixing molten copper or copper alloy with coal combustion gases to form a two-phase fluid, means for feeding said twophase fluid as working fluid to the MHD generator, means for separating molten copper or copper alloy from the gas stream after leaving the MHD generator, means for returning the molten copper or copper alloy to the mixer, and means for obtaining additional energy from the gas stream prior to exhausting said stream to the atmosphere.

2. MHD generating system according to claim 1 including a sulfur clean-up system operating on a sidestream of copper being recycled to the mixer.

3. MHD generating system according to claim 2 wherein the coal combustor is operated substoichiometrically and including a secondary combustor for burning the combustible gases remaining in the gas after separation from the copper.

4. A method of generating power comprising burning coal substoichiometrically in a cyclone combustor, mixing combustion gas with molten copper to form a two-phase mixture, passing said two-phase mixture through an MHD generator to generate electrical power, separating the molten copper from the combustion gases, returning the molten copper to the mixer, treating a sidestream thereof to remove sulfur therefrom, burning uncombusted gases in the combustion gas exhausted from the separator, recovering useful energy from said combustion gas and exhausting said gas to the atmosphere.

5. Method according to claim 4 wherein sulfur is removed from the copper by bubbling oxygen therethrough.

* * * * *